United States Patent [19]

Tseng

[11] Patent Number: 5,779,344
[45] Date of Patent: Jul. 14, 1998

[54] LIGHT EMITTING ROLLER FOR ROLLER SKATES

[76] Inventor: Shen-Ko Tseng, No. 28, Lane 41, Chyau-Dong St., Shih-Chih Jenn Taipei Hsien, Taiwan

[21] Appl. No.: 614,699

[22] Filed: Mar. 13, 1996

[51] Int. Cl.⁶ ..................................... B60Q 1/26
[52] U.S. Cl. ..................... 362/78; 362/86; 362/103; 362/234; 362/276; 362/802
[58] Field of Search ................ 362/61, 78, 103, 362/234, 253, 276, 802, 806, 86, 83.3; 280/811, 816

[56] References Cited

U.S. PATENT DOCUMENTS

| | | | |
|---|---|---|---|
| 5,294,188 | 3/1994 | Vancil Jr. | 301/5.3 |
| 5,475,572 | 12/1995 | Tseng | 362/78 |
| 5,653,523 | 8/1997 | Roberts | 362/78 |

*Primary Examiner*—Stephen F. Husar
*Attorney, Agent, or Firm*—Pro-Techtor International Services

[57] ABSTRACT

A light emitting roller for roller skates, including a roller body having a center axle hole for mounting on a wheel axle, an annular groove around said center axle hole at an outer side, a battery chamber and two opposite through holes at said annular groove; an annular circuit board mounted within the annular groove on the roller, having a plurality of light emitting elements controlled to emit light through the through holes on the roller body, an automatic switch, an opening, two metal contact plates at two opposite sides of the opening, and a battery cell connected between the metal contact plates and mounted within the battery chamber on the roller to provide electric power supply to the light emitting elements through the automatic switch; and an annular cap mounted within the annular groove on the roller to hold down the annular.

12 Claims, 11 Drawing Sheets

LIGHT EMITTING ROLLER FOR ROLLER SKATES

BACKGROUND OF THE INVENTION

The present invention relates to a light emitting roller for roller skates which automatically drive the light emitting diodes thereof to flash when rotated during skating.

Skating on roller skates is a sports game invited by young children. Roller skates with light emitting rollers have been developed. These roller skates emit light when they are moving. FIG. 1 shows a light emitting roller according to the prior art which comprises a battery cell mounted within a battery chamber on the roller body thereof, a manual switch mounted within a hole on the roller body, and a series of light emitting diodes mounted in a respective hole on an annular groove on the roller body and connected in series to the two opposite terminals of the battery cell through the manual switch. When the manual switch is switched on, electric circuit is closed, and therefore the light emitting diodes are turned on to give off light. Because the light emitting diodes are controlled by the manual switch, they keep consuming battery power supply when the manual switch is switched on. Furthermore, because the manual switch is disposed outside the roller body for operation by hand, the installation of the manual switch destroys the sense of beauty of the roller skate.

SUMMARY OF THE INVENTION

The present invention provides a light emitting roller for roller skates which comprises a roller body having a center axle hole for mounting on a wheel axle, an annular groove around said center axle hole at an outer side, a battery chamber and two opposite through holes at said annular groove; an annular circuit board mounted within the annular groove on the roller, having a plurality of light emitting elements controlled to emit light through the through holes on the roller body, an automatic switch, an opening, two metal contact plates at two opposite sides of the opening, and a battery cell connected between the metal contact plates and mounted within the battery chamber on the roller to provide electric power supply to the light emitting elements through the automatic switch; and an annular cap mounted within the annular groove on the roller to hold down the annular. When the roller is rotated during skating, the automatic switch is intermittently switched on, causing the light emitting elements driven to flash. When the roller is stopped, the automatic switch is automatically switched off to cut off power supply from the light emitting elements. Because all component parts are covered within the annular groove on the roller body by the annular cap, the sense of beauty of the roller skate is maintained intact.

DETAILED DESCRIPTION OF THE PREFERRED EMBODIMENTS

Figure 1:
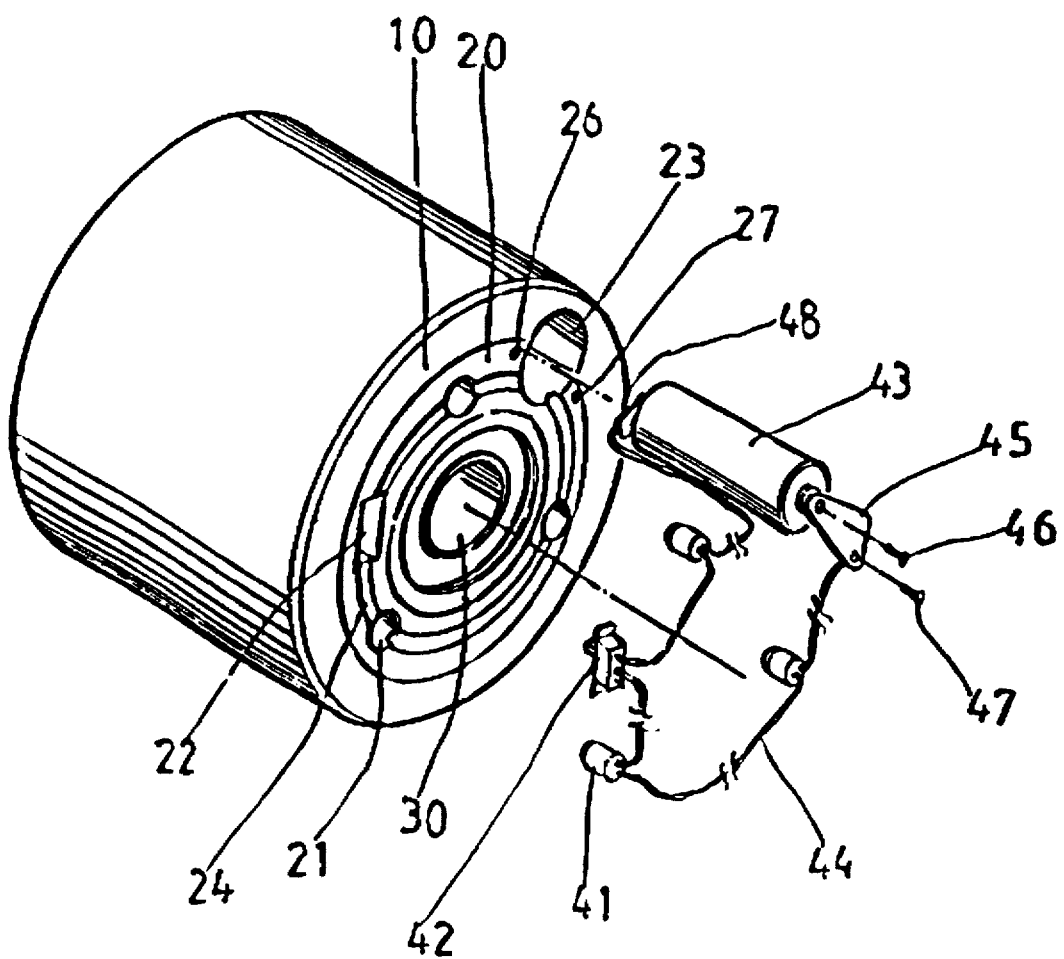
FIG. 1 is an exploded view of a light emitting roller according to the prior art.
Figure 2:
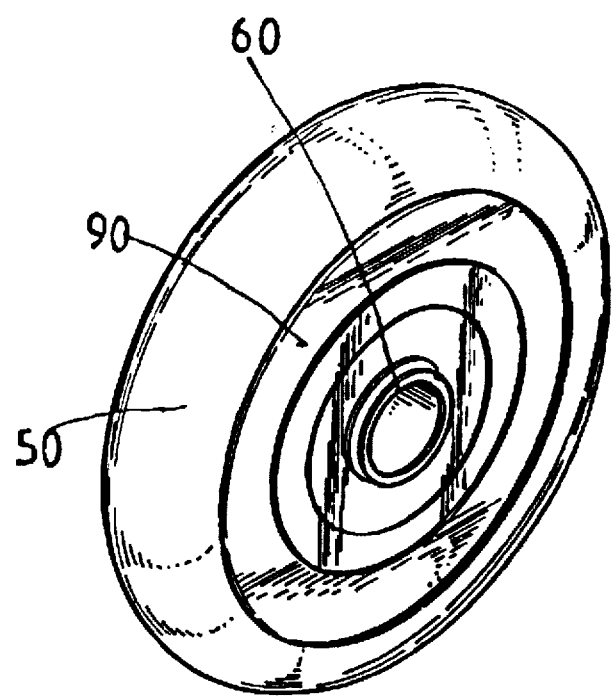
FIG. 2 is an elevational view of a light emitting roller according to the present invention.
Figure 3:
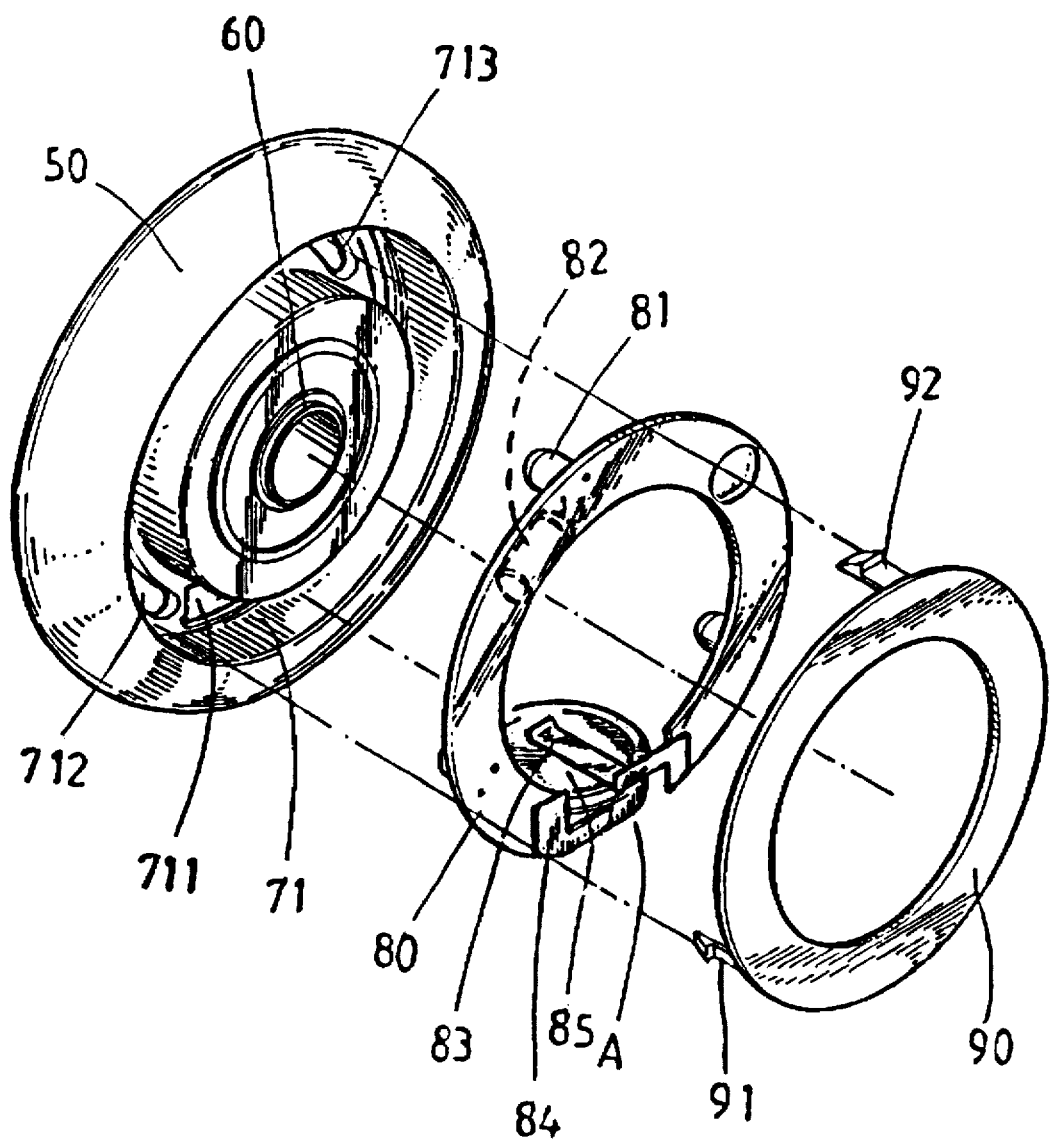
FIG. 3 is an exploded view of the light emitting roller shown in FIG. 2.
Figure 4:
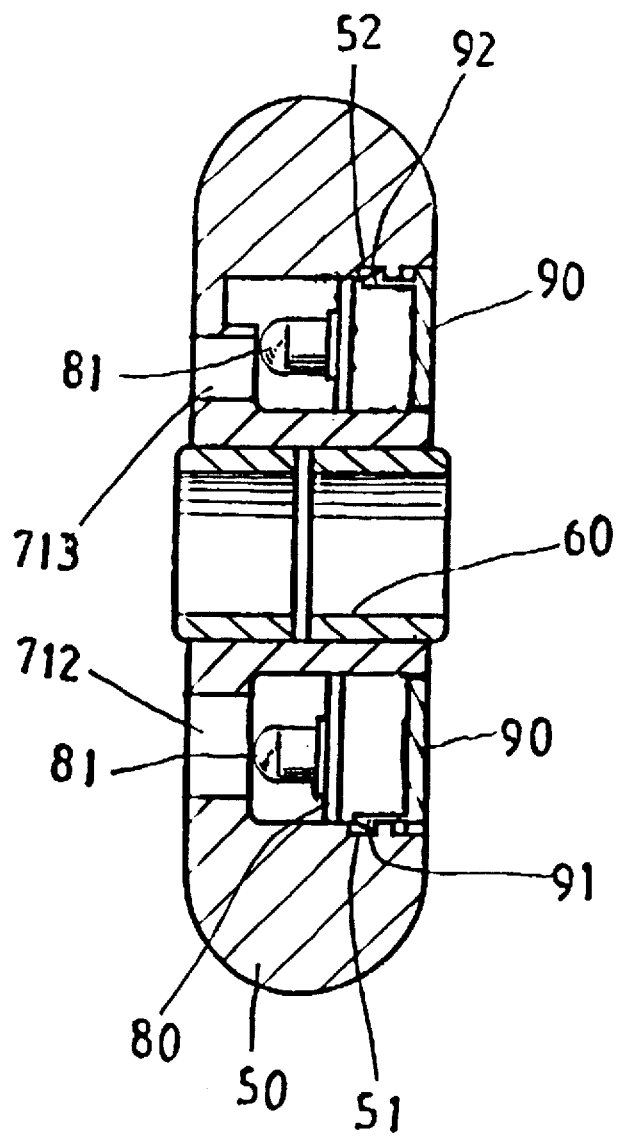
FIG. 4 is a side view in section of the light emitting roller shown in FIG. 2.

Referring to FIGS. 2, 3, and 4, the roller, referenced by 50, comprises a center axle hole 60 for mounting on a wheel axle (not shown), an annular groove 71 around the center axle hole 60 at an outer side, a battery chamber 711 and two opposite through holes 712 and 713 and two opposite retaining holes 51 and 52 at the annular groove 71. An annular circuit board 80 is mounted within the annular groove 71 on the roller 50, comprising a plurality of light emitting elements 81, an automatic switch 82 with two rolling balls 821 and 822 (see FIG. 5), an opening A at a suitable location, two metal contact plates 83 and 84 at two opposite sides by the opening A, and a battery cell 85 connected between the metal contact plates 83 and 84 and mounted within the battery chamber 711. An annular cap 90 is mounted within the annular groove 71 on the roller 50 to hold down the annular circuit board 80, having two mounting hooks 91 and 92 respectively hooked on the retaining holes 51 and 52. When installed, it is not necessary to control the automatic switch 82 in turning on the light emitting elements 81. When the roller 50 is moved during skating, the automatic switch 82 will be automatically and intermittently switched on to drive the light emitting elements 81, causing them to flash.

Figure 5:
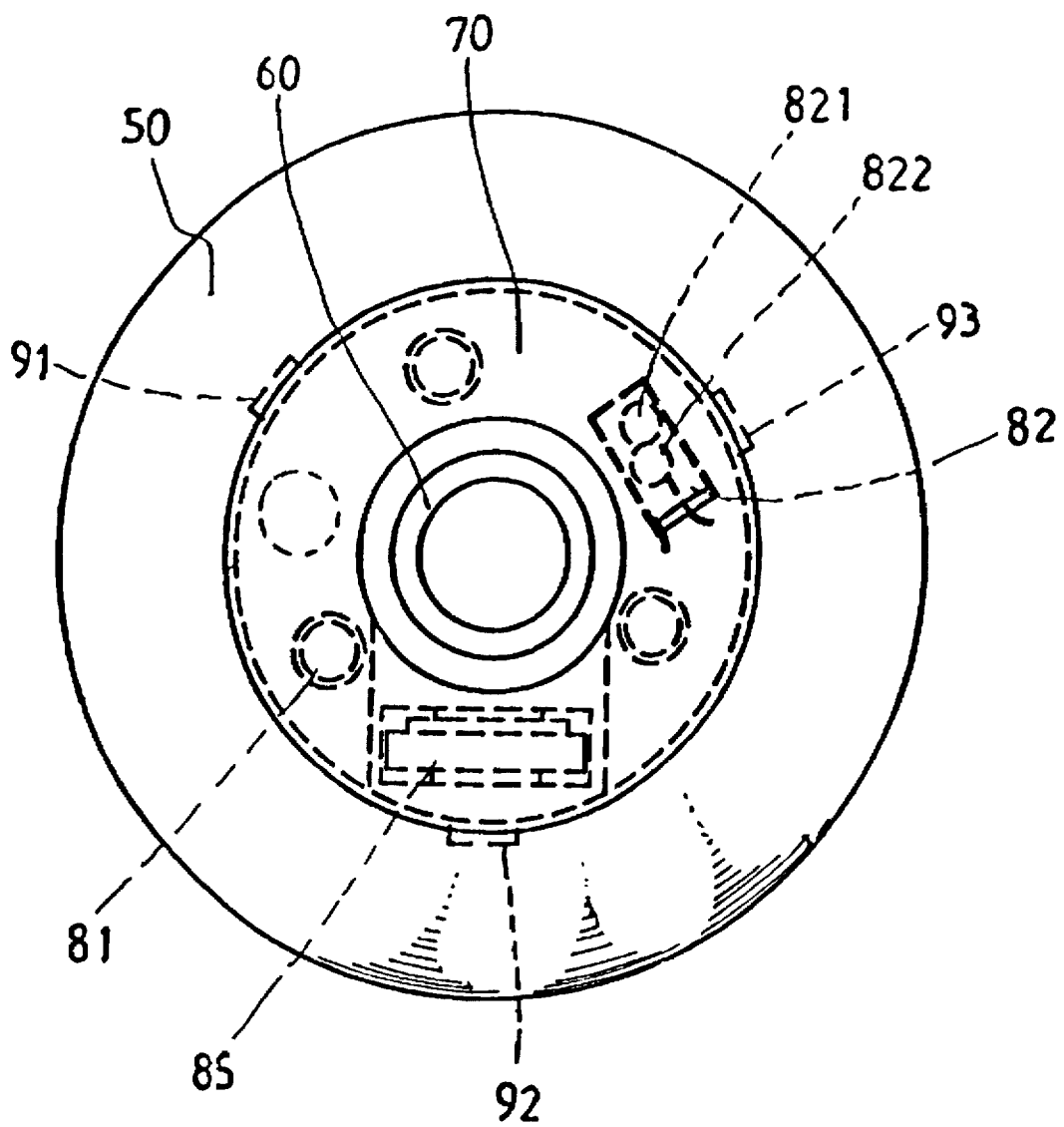
FIG. 5 is a perspective front view of the light emitting roller shown in FIG. 2.
Figure 6:
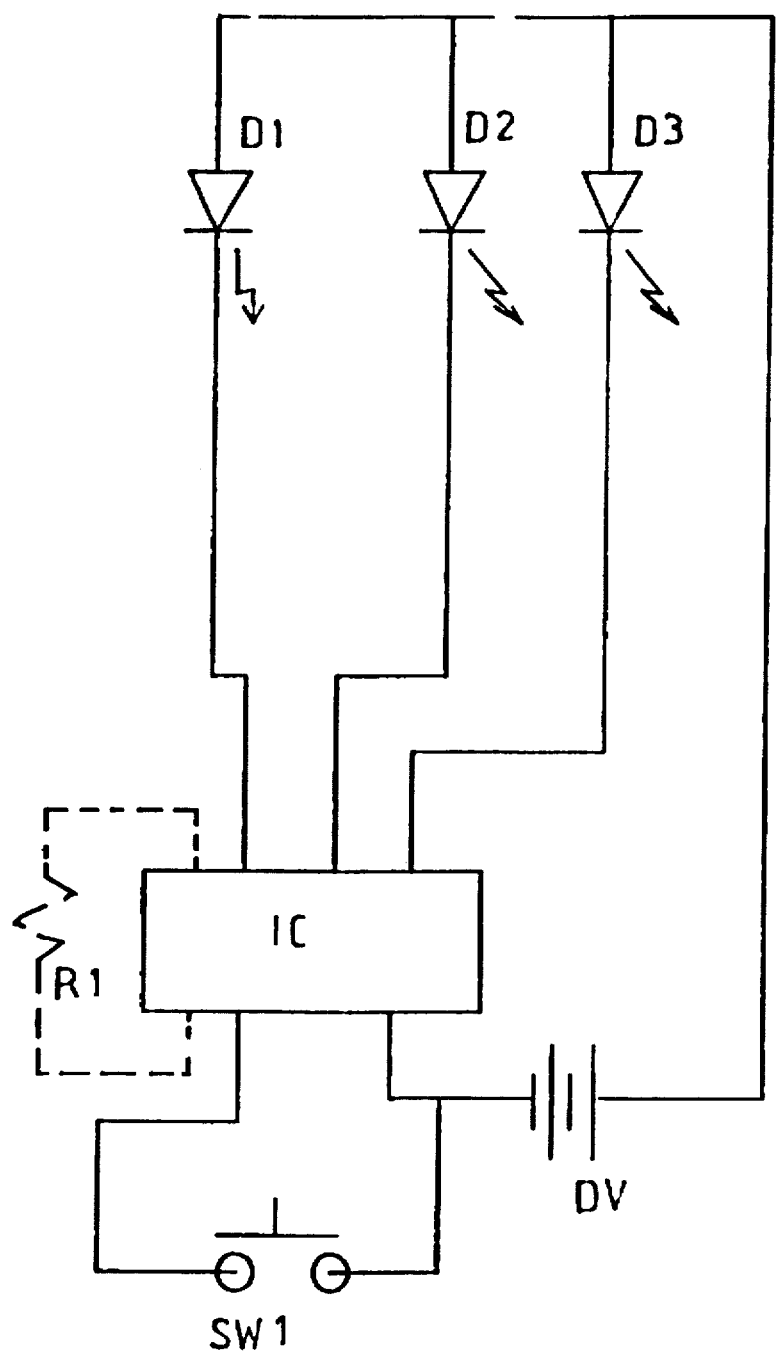
FIG. 6 is a circuit diagram of the electric circuit of the light emitting roller according to the present invention.
Figure 7:
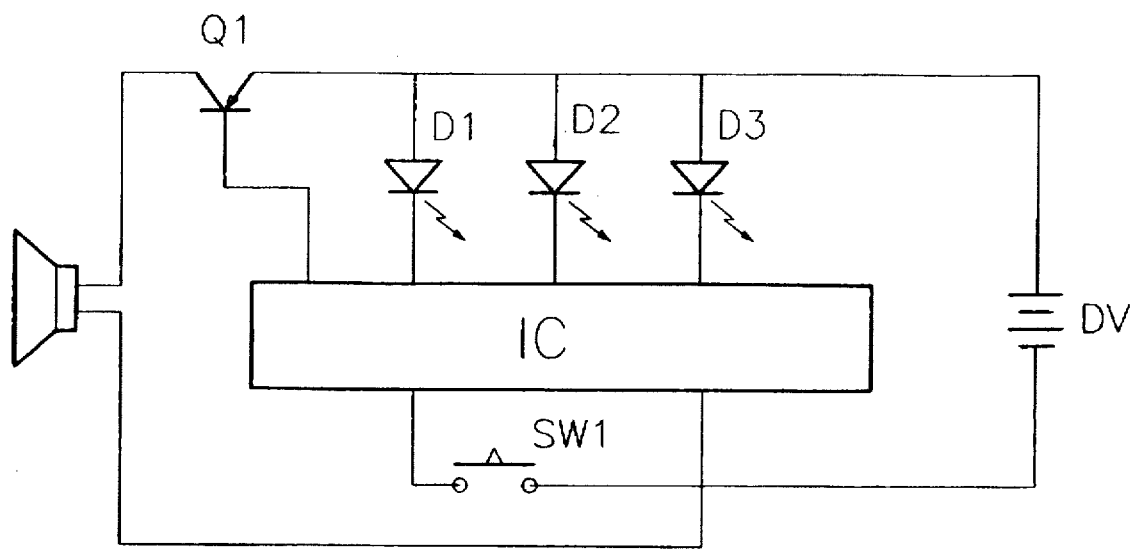
FIG. 7 shows an alternate form of the electric circuit according to the present invention.
Figure 8:
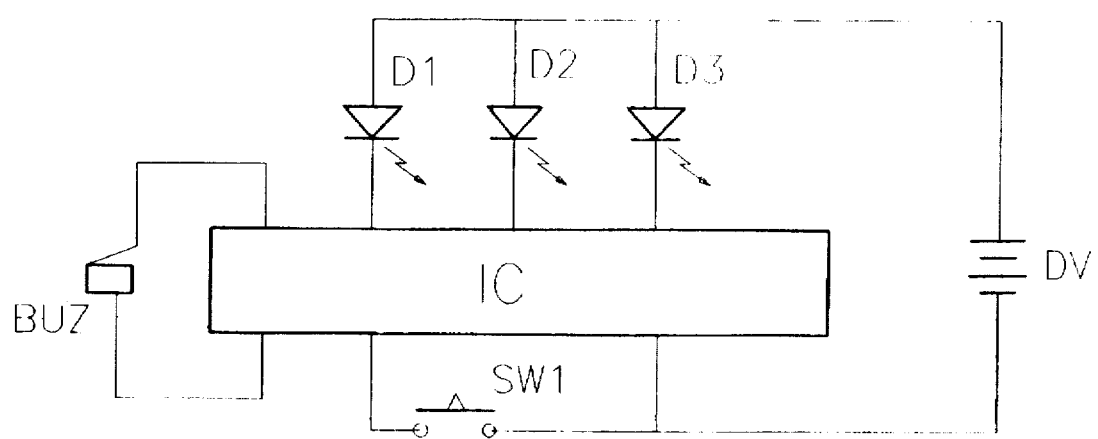
FIG. 8 shows another alternate form of the electric circuit according to the present invention.

Referring to FIG. 5, the automatic switch 82 has two rolling balls 821 and 822 on the inside, which automatically switch on the electric circuit when they contact each other. As illustrated in FIG. 6, an IC is connected to the battery cell (namely, 85) and the light emitting diodes D1, D2 and D3 (they can have different colors), and a resistor R1 is optionally installed to accelerate the flashing of the light emitting diodes D1, D2 and D3. In the embodiment shown in FIG. 7, the capacitor Q1 is installed to match with a speaker; in the embodiment shown in FIG. 8, a buzzer is installed and connected to IC. When the positive ball 821 contacts the negative ball 822, SW1 is triggered to drive IC, causing D1, D2 and D3 to flash for a predetermined length of time. When the balls 821 and 822 contact each other again, IC is triggered to drive D1, D2 and D3, causing them to flash again. This procedure is repeated again and again while skating. When the roller 50 is turned around the axis of the center axle hole 60, the balls 821 and 822 are forced to move relative to each other, causing the light emitting elements 81 to flash continuously (because the time in which the balls 821 and 822 are separated from each other during skating is shorter than one flashing cycle of the light emitting elements 81 (D1, D2 and D3) controlled by the aforesaid IC. When the roller 50 is stopped, the balls 821 and 822 are retained separated from each other, therefore the light emitting elements 81 are turned off.

Figure 9:
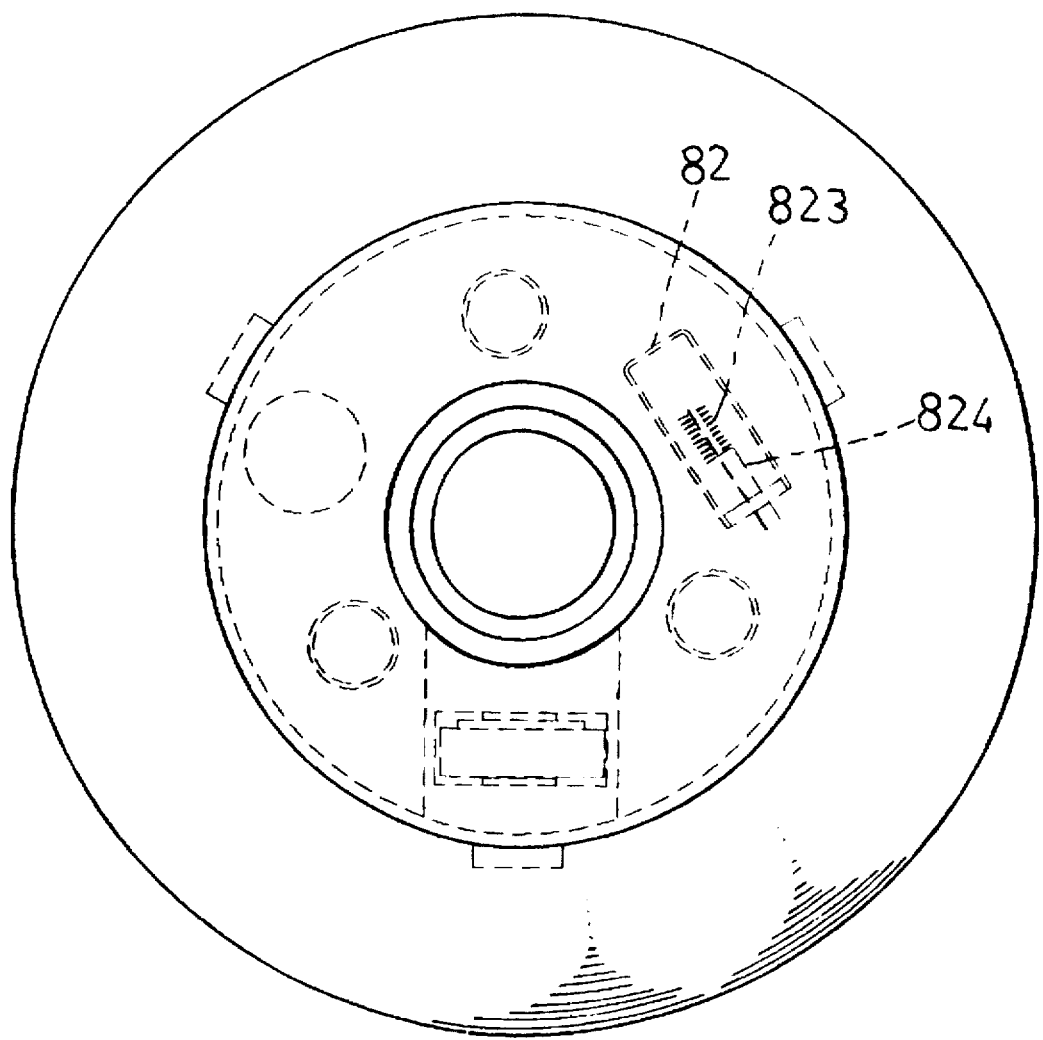
FIG. 9 shows an alternate form of the automatic switch according to the present invention.

FIG. 9 shows an alternate form of the automatic switch 82. According to this alternate form, the automatic switch 82 comprises an electric conductive filament 824 mounted on the inside, and a metal coil spring 823 suspending on the inside around the electric conductive filament 824. When the automatic switch 82 is shaken, the metal coil spring 823 is oscillated to intermittently contact the electric conductive filament 824.

Figure 10:
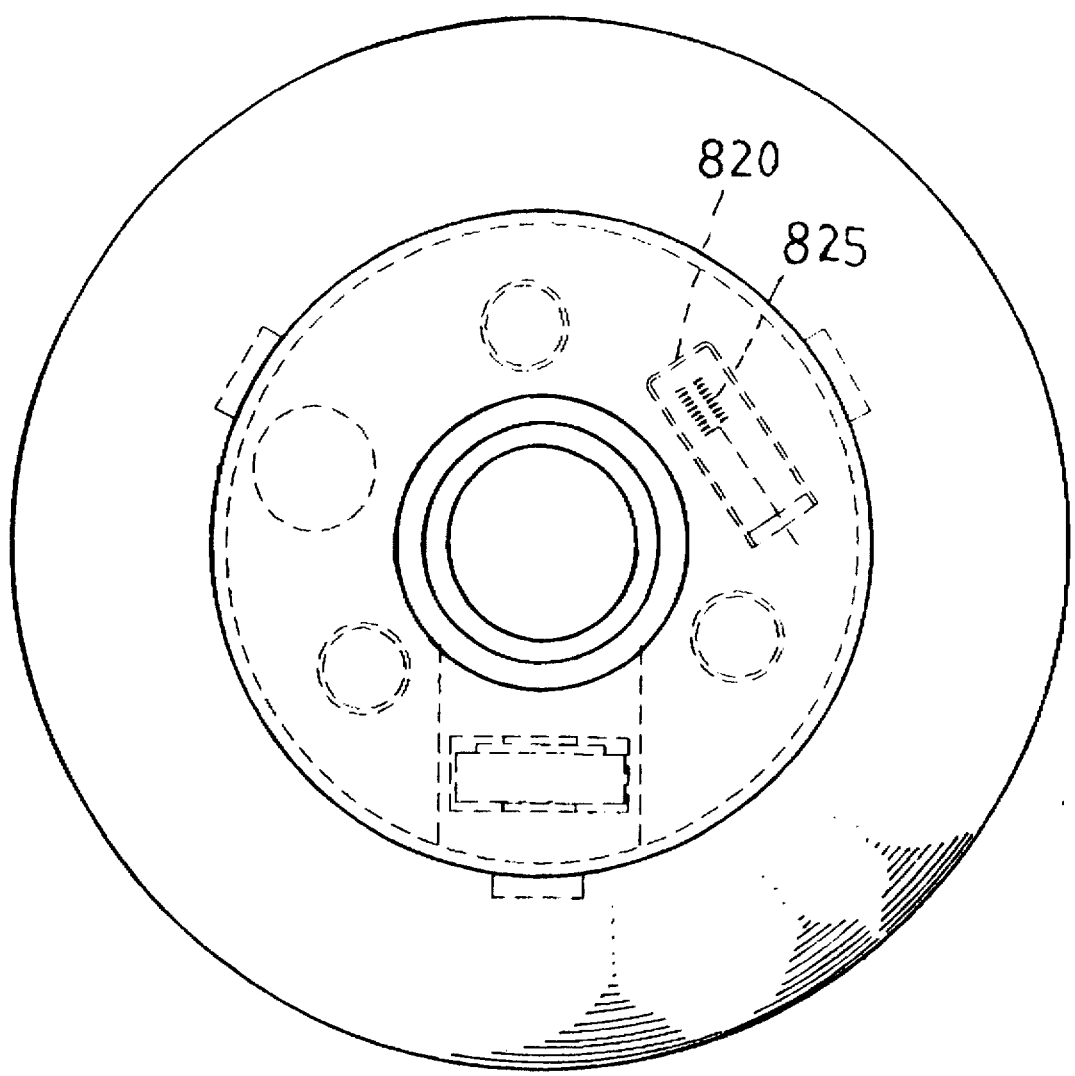
FIG. 10 shows another alternate form of the automatic switch according to the present invention.

FIG. 10 shows another alternate form of the automatic switch. According to this alternate form, the automatic switch comprises a metal shell .820 connected to one end of the electric circuit, and a metal spring 825 suspending in the metal shell 820 and connected to the opposite end of the electric circuit. When the light emitting roller runs, the metal spring 825 is oscillated to intermittently contact the metal shell 820.

Figure 11:
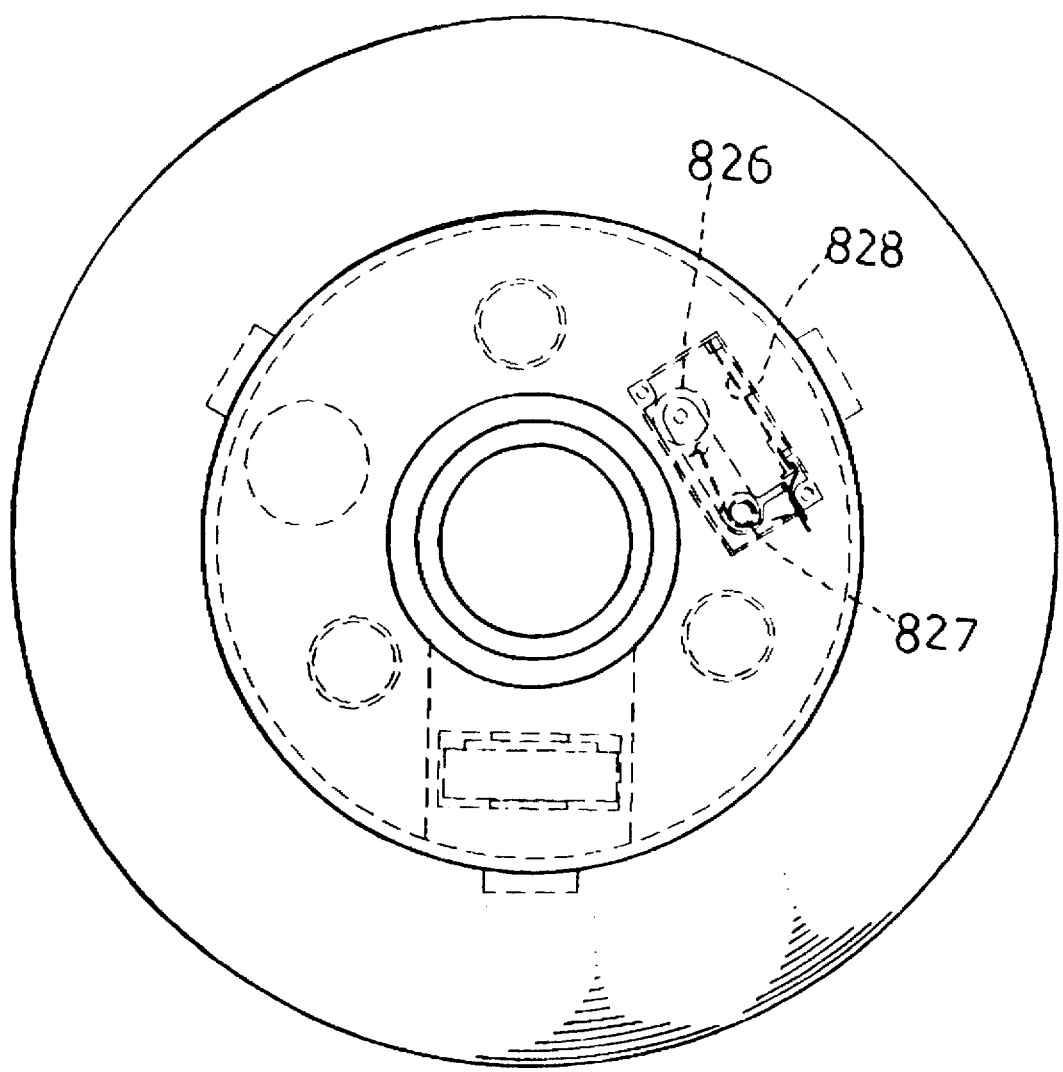
FIG. 11 shows still another alternate form of the automatic switch according to the present invention.

FIG. 11 shows still another alternate form of the automatic switch. According to this alternate form, the automatic switch comprises a metal contact plate 828 fixedly secured on the inside and connected to one end of the electric circuit, and a metal pendulum 826 turned about a metal pivot 827 connected to the opposite end of the electric circuit. When the light emitting roller moves, the metal pendulum 826 is oscillated to intermittently contact the metal contact plate 828.

It is to be understood that the drawings are designed for purposes of illustration only, and are not intended as a definition of the limits and scope of the invention disclosed.

I claim:

1. A light emitting roller for roller skates, comprising:

a roller body having a center axle hole to receive a wheel axle, an annular groove around said center axle hole at an outer side, a battery chamber and two opposite through holes at said annular groove;

an annular circuit board mounted within said annular groove on said roller, said annular circuit board comprising a plurality of light emitting elements controlled to emit light through the through holes on said roller body, an automatic switch, an opening, two metal contact plates at two opposite sides of said opening, and a battery cell connected between said metal contact plates and mounted within said battery chamber on said roller to provide electric power supply to said light emitting elements through said automatic switch; and an annular cap mounted within said annular groove on said roller to hold down said annular circuit board; and wherein said automatic switch comprises an electric conductive filament connected to one end of said battery cell, and a metal coil spring connected to an opposite end of said battery cell and suspending around said electric conductive filament.

2. The light emitting roller of claim 1 wherein said annular circuit board further comprises a resistor connected to said automatic switch to accelerate the flashing of said light emitting elements.

3. The light emitting roller of claim 1 wherein said annular circuit board further comprises a speaker connected to said automatic switch.

4. The light emitting roller of claim 1 wherein said annular circuit board further comprises a buzzer connected to said automatic switch.

5. A light emitting roller for roller skates, comprising:

a roller body having a center axle hole for mounting on a wheel axle, an annular groove around said center axle hole at an outer side, a battery chamber and two opposite through holes at said annular groove;

an annular circuit board mounted within said annular groove on said roller, said annular circuit board comprising a plurality of light emitting elements controlled to emit light through the through holes on said roller body, an automatic switch, an opening, two metal contact plates at two opposite sides of said opening, and a battery cell connected between said metal contact plates and mounted within said battery chamber on said roller to provide electric power supply to said light emitting elements through said automatic switch; and an annular cap mounted within said annular groove on said roller to hold down said annular circuit board; and wherein said automatic switch comprises a metal shell connected to one end of said battery cell, and a metal spring connected to an opposite end of said battery cell and suspending in said metal shell.

6. The light emitting roller of claim 5 wherein said annular circuit board further comprises a resistor connected to said automatic switch to accelerate the flashing of said light emitting elements.

7. The light emitting roller of claim 5 wherein said annular circuit board further comprises a speaker connected to said automatic switch.

8. The light emitting roller of claim 5 wherein said annular circuit board further comprises a buzzer connected to said automatic switch.

9. A light emitting roller for roller skates, comprising:

a roller body having a center axle hole for mounting on a wheel axle, an annular groove around said center axle hole at an outer side, a battery chamber and two opposite through holes at said annular groove;

an annular circuit board mounted within said annular groove on said roller, said annular circuit board comprising a plurality of light emitting elements controlled to emit light through the through holes on said roller body, an automatic switch, an opening, two metal contact plates at two opposite sides of said opening, and a battery cell connected between said metal contact plates and mounted within said battery chamber on said roller to provide electric power supply to said light emitting elements through said automatic switch; and an annular cap mounted within said annular groove on said roller to hold down said annular circuit board; and wherein said automatic switch comprises a metal contact plate connected to one end of said battery cell and a metal pendulum having a fixed end connected to an opposite end of said battery cell and a free end moved to intermittently contact the metal contact plate of said automatic switch.

10. The light emitting roller of claim 9 wherein said annular circuit board further comprises a resistor connected to said automatic switch to accelerate the flashing of said light emitting elements.

11. The light emitting roller of claim 9 wherein said annular circuit board further comprises a speaker connected to said automatic switch.

12. The light emitting roller of claim 9 wherein said annular circuit board further comprises a buzzer connected to said automatic switch.

* * * * *